US011303900B2

(12) United States Patent
Hsu

(10) Patent No.: US 11,303,900 B2
(45) Date of Patent: *Apr. 12, 2022

(54) METHOD AND APPARATUS FOR MOTION BOUNDARY PROCESSING

(71) Applicant: MediaTek Inc., Hsin-Chu (TW)

(72) Inventor: Chih-Wei Hsu, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 69 days.

This patent is subject to a terminal disclaimer.

(21) Appl. No.: 15/036,900

(22) PCT Filed: Dec. 5, 2014

(86) PCT No.: PCT/CN2014/093148
§ 371 (c)(1),
(2) Date: May 16, 2016

(87) PCT Pub. No.: WO2015/081888
PCT Pub. Date: Jun. 11, 2015

(65) Prior Publication Data
US 2016/0295215 A1    Oct. 6, 2016

Related U.S. Application Data

(60) Provisional application No. 61/912,686, filed on Dec. 6, 2013.

(51) Int. Cl.
*H04N 19/583*    (2014.01)
*H04N 19/51*    (2014.01)
(Continued)

(52) U.S. Cl.
CPC ......... *H04N 19/139* (2014.11); *H04N 19/105* (2014.11); *H04N 19/124* (2014.11);
(Continued)

(58) Field of Classification Search
CPC .. H04N 19/647; H04N 19/105; H04N 19/139; H04N 19/124; H04N 19/13;
(Continued)

(56) References Cited

U.S. PATENT DOCUMENTS 10,230,980 B2 *  3/2019  Liu ...................... H04N 19/583
10,939,118 B2 *  3/2021  Shih ...................... H04N 19/80
(Continued)

FOREIGN PATENT DOCUMENTS

| CN | 101309405 | 11/2008 |
| EP | 1 175 920 | 1/2002 |
| EP | 1455536 | 12/2005 |

OTHER PUBLICATIONS

Choi, B.D., et al.; "Motion-Compensation Frame Interpolation Using Bilateral Motion Estimation and Adaptive Overlapped Block Motion Compensation;" IEEE Transactions on Circuits and Systems for Video Technology; vol. 17; No. 4; Apr. 2007; pp. 407-416.
(Continued)

*Primary Examiner* — Albert Kir
(74) *Attorney, Agent, or Firm* — Wolf, Greenfield & Sacks, P.C.

(57) ABSTRACT

A method and apparatus for deriving motion compensated prediction for boundary pixels in a video coding system are disclosed. Embodiments of the present invention determine a current motion vector (MV) and one or more neighboring MVs corresponding to an above MV, a left MV, or both the above MV and the left MV. A first predictor for a current boundary pixel in a boundary region of the current CU is generated by applying motion compensation based on the current MV and a first reference picture pointed by the current MV. One or more second predictors for the current boundary pixel are generated by applying the motion compensation based on the neighboring MVs and reference pictures pointed by the neighboring MVs. A current bound- (Continued)

ary pixel predictor for the current boundary pixel is then generated using a weighted sum of the first predictor and the second predictors according to weighting factors.

19 Claims, 5 Drawing Sheets

(51) Int. Cl.
  *H04N 19/139* (2014.01)
  *H04N 19/105* (2014.01)
  *H04N 19/182* (2014.01)
  *H04N 19/573* (2014.01)
  *H04N 19/124* (2014.01)
  *H04N 19/13* (2014.01)
  *H04N 19/15* (2014.01)
  *H04N 19/186* (2014.01)
  *H04N 19/176* (2014.01)
  *H04N 19/96* (2014.01)

(52) U.S. Cl.
  CPC .............. *H04N 19/13* (2014.11); *H04N 19/15* (2014.11); *H04N 19/182* (2014.11); *H04N 19/186* (2014.11); *H04N 19/573* (2014.11); *H04N 19/583* (2014.11); *H04N 19/176* (2014.11); *H04N 19/96* (2014.11)

(58) Field of Classification Search
  CPC .... H04N 19/15; H04N 19/182; H04N 19/186; H04N 19/573; H04N 19/583; H04N 19/176; H04N 19/96
  USPC .......................... 375/240.15, 240.16, 240.12
  See application file for complete search history.

(56) References Cited

U.S. PATENT DOCUMENTS

| | | | |
|---|---|---|---|
| 2005/0152453 A1* | 7/2005 | Lee | H04N 19/147 375/240.16 |
| 2005/0281334 A1* | 12/2005 | Walker | H04N 19/105 375/240.16 |
| 2006/0193388 A1* | 8/2006 | Woods | H04N 19/647 375/240.16 |
| 2011/0110427 A1 | 5/2011 | Teng et al. | |
| 2013/0051470 A1 | 2/2013 | Noguchi | |
| 2013/0128974 A1* | 5/2013 | Chien | H04N 19/105 375/240.15 |

OTHER PUBLICATIONS

Ge, J., et al . . . ; "A Robust Video Super-resolution Based on Adaptive Overlapped Block Motion;" 2013 International Conference on Signal-Image Technology & Internet-Based Systems; 2013; pp. 187-194.

Guo, L., et al.; "CE2 Overlapped Block Motion Compensation for 2N×N and Motion Partitions;" Joint Collaborative Team on Video Coding (JCT-VC) of ITU-T SG16 WP3 and ISO/IEC JTC1/SC29/WG11; Jul. 2011; pp. 1-7.

Fukushima, S.; "Decoder-side block boundary decision (DBBD) with OBMC," Joint Collaborative Team on Video Coding (JCT-VC) of ITU-T SG16 WP3 and ISO/IEC JTC1/SC29/WG11; Oct. 2010; pp. 1-11.

Su, J.K., et al.; "Motion Estimation Methods for Overlapped Block Motion Compensation;" IEEE Transactions on Image Processing; vol. 9; No. 9; Sep. 2000; pp. 1509-1521.

Peng, W.H., et al.; "6. An Interframe Prediction Technique Combining Template Matching Prediction and Block-Motion Compensation for High-Efficiency Video Coding;" IEEE Transactions on Circuits and Systems for Video Technology; vol. 23; No. 8; Aug. 2013; pp. 1432-1446.

International Search Report dated Mar. 4, 2015, issued in application No. PCT/CN2014/093148.

International Preliminary Report on Patentability mailed Jun. 16, 2016 in connection with International Application No. PCT/CN2014/093148.

* cited by examiner

METHOD AND APPARATUS FOR MOTION BOUNDARY PROCESSING

CROSS REFERENCE TO RELATED APPLICATIONS

This application is a national stage filing under 35 U.S.C. 371 of International Patent Application Serial No. PCT/CN2014/093148, filed Dec. 5, 2014, which claims priority to U.S. Provisional Patent Application, Ser. No. 61/912,686, filed on Dec. 6, 2013, entitled "Motion Boundary Enhancement". The Patent Applications are hereby incorporated by reference in their entirety.

FIELD OF INVENTION

The present invention relates to video coding. In particular, the present invention relates to method and apparatus for motion boundary processing to reduce discontinuity at coding unit boundaries.

BACKGROUND OF THE INVENTION

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary system block diagram for a video encoder based on High Efficiency Video Coding (HEVC) using adaptive Inter/Intra prediction. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130 and Sample Adaptive Offset (SAO) 131 have been developed to enhance picture quality. The in-loop filter information may have to be incorporated in the bitstream so that a decoder can properly recover the required information. Therefore, in-loop filter information from SAO is provided to Entropy Encoder 122 for incorporation into the bitstream. In FIG. 1A, DF 130 is applied to the reconstructed video first; and SAO 131 is then applied to DF-processed video. However, the processing order among DF and SAO can be re-arranged.

A corresponding decoder for the encoder of FIG. 1A is shown in FIG. 1B. The video bitstream is decoded by Video Decoder 142 to recover the transformed and quantized residues, DF/SAO information and other system information. At the decoder side, only Motion Compensation (MC) 113 is performed instead of ME/MC. The decoding process is similar to the reconstruction loop at the encoder side. The recovered transformed and quantized residues, DF/SAO information and other system information are used to reconstruct the video data. The reconstructed video is further processed by DF 130 and SAO to produce the final enhanced decoded video.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU, also referred as CTU, coded tree unit in HEVC). In addition to the concept of coding unit, the concept of prediction unit (PU) is also introduced in HEVC. Once the splitting of CU hierarchical tree is done, each leaf CU is further split into prediction units (PUs) according to prediction type and PU partition. The Inter/Intra prediction process in HEVC is applied to the PU basis. For each 2N×2N leaf CU, a partition size is selected to partition the CU. A 2N×2N PU may be partitioned into 2N×2N, 2N×N, or N×2N PU when Inter mode is selected. When a 2N×2N PU is Intra coded, the PU may be partitioned into either one 2N×2N or four N×N.

While non-overlapped motion prediction blocks are most used in HEVC practice, there are also proposals for overlapped motion compensation presented during HEVC standard development. Overlapped Block Motion Compensation (OBMC) is a technical proposed proposal during the HEVC standard development. OBMC utilizes a Linear Minimum Mean Squared Error (LMMSE) technique to estimate a pixel intensity value based on motion-compensated signals derived from neighboring block motion vectors (MVs). From an estimation-theoretic perspective, these MVs are regarded as different plausible hypotheses for its true motion, and to maximize coding efficiency, their weights should minimize the mean squared prediction error subject to the unit-gain constraint.

An OBMC proposal during HEVC development is disclosed in JCTVC-C251 (Chen, et al, "*Overlapped block motion compensation in TMuC*", in Joint Collaborative Team on Video Coding (JCT-VC), of ITU-T SG16 WP3 and ISO/IEC JTC1/SC29/WG11 3rd Meeting: Guangzhou, CN, 7-15 Oct. 2010, Document: JCTVC-C251), where OBMC is applied to geometry partition. In geometry partition, it is very likely that a transform block contains pixels belonging to different partitions since two different motion vectors are used for motion compensation. Therefore, the pixels at the partition boundary may have large discontinuities that can produce visual artifacts similar to blockiness. This in turn decreases the coding efficiency since the signal energy in the transform domain will spread wider toward high frequencies. Let the two regions created by a geometry partition be denoted as region 1 and region 2. The zig-zag line segments (210) indicate the partition line for region 1 and region 2 in FIG. 2. A pixel from region 1 (2) is defined to be a boundary pixel if any of its four connected neighbors (left, top, right, and bottom) belongs to region 2 (1). FIG. 2 illustrates an example, where pixels corresponding to the boundary of region 1 are indicated by pattern 220 and pixels corresponding to the boundary of region 2 are indicated by pattern 230. If a pixel is a boundary pixel (220 or 230), the motion compensation is performed using a weighted sum of the motion predictions from the two motion vectors. The weights are ¾ for the prediction using the motion vector of the region containing the boundary pixel and ¼ for the prediction using the motion vector of the other region. In other words, the pixel at the boundary is derived from the weighted sum of two predictors corresponding to two different motion vectors. The overlapping boundaries improve the visual quality of the reconstructed video while providing BD-rate gain.

Another OBMC proposal during the HEVC standard development is disclosed in JCTVC-F299 (Guo, et al, "*CE2: Overlapped Block Motion Compensation for 2N×N and N×2N Motion Partitions*", in Joint Collaborative Team on Video Coding (JCT-VC), of ITU-T SG16 WP3 and ISO/IEC JTC1/SC29/WG11, 6th Meeting: Torino, 14-22 Jul. 2011, Document: JCTVC-F299), where OBMC is applied to symmetrical motion partitions. If a coding unit (CU) is partitioned into two 2N×N or N×2N partition units (PUs), OBMC is applied to the horizontal boundary of the two 2N×N prediction blocks, and the vertical boundary of the two N×2N prediction blocks. Since those partitions may have different motion vectors, the pixels at partition boundary (i.e., PU boundaries) may have large discontinuities, which may generate visual artifacts and also reduce the coding efficiency. In JCTVC-F299, OBMC is introduced to smooth the boundaries of motion partition.

FIG. 3 illustrates exemplary OBMC for 2N×N (FIG. 3A) and N×2N blocks (FIG. 3B). The pixels in the shaded area belong to Partition 0 and the pixels in the clear area belong to Partition 1. The overlapped region in the luma component is defined as 2 rows (or columns) of pixels on each side of the horizontal (or vertical) PU boundary. For pixels that are 1 row (or column) apart from the partition boundary, i.e., pixels labeled as A in FIG. 3, OBMC weighting factors are (¾, ¼). For pixels that are 2 rows (columns) away from the partition boundary, i.e., pixels labeled as B in FIG. 3, OBMC weighting factors are (⅞, ⅛). For chroma components, the overlapped region is defined as 1 row (or column) of pixels on each side of the horizontal (or vertical) PU boundary, and the weighting factors are (¾, ¼).

SUMMARY OF THE INVENTION

A method and apparatus for deriving motion compensated prediction for boundary pixels in a video coding system are disclosed. Embodiments of the present invention determine a current motion vector (MV) and one or more neighboring MVs corresponding to an above MV, a left MV, or both the above MV and the left MV. A first predictor for a current boundary pixel in a boundary region of the current CU is generated by applying motion compensation based on the current MV and a first reference picture pointed by the current MV. One or more second predictors for the current boundary pixel are generated by applying the motion compensation based on the neighboring MVs and reference pictures pointed by the neighboring MVs. A current boundary pixel predictor for the current boundary pixel is then generated using a weighted sum of the first predictor and said one or more second predictors according to weighting factors.

The boundary region of the current CU may correspond to a number of pixel lines, pixel columns, or both at CU boundaries of the current CU. The number of pixel lines, pixel columns, or both at the CU boundaries of the current CU can be pre-defined or adaptively determined based on CU size or PU size. The weighting factors can be pre-defined or adaptively determined based on the distance between the current boundary pixel and a left or above CU boundary.

When both the above MV and the left MV are used, two second predictors can be generated for the current boundary pixel based on the above MV and the left MV respectively to form the current boundary pixel predictor. Alternatively, one second predictor can be generated for the current boundary pixel based on one neighboring MV selected from the above MV and the left MV and used to form a first-stage current boundary pixel predictor. Another second predictor can be generated for the current boundary pixel based on the other neighboring MV selected from the above MV and the left MV and used to form a final current boundary pixel predictor. The first-stage current boundary pixel predictor can be formed based on the above MV or the left MV.

The MBE prediction process can be always performed for the current CU, or can be turned On/Off explicitly The MBE prediction process can be applied jointly or independently with the overlapped boundary motion compensation (OBMC) process applied to PU boundary pixels in the current CU when the current CU is partitioned into two or more current prediction units (PUs). The current CU comprises a luma component and at least one chroma component and the weighting factors for the luma component and said at least one chroma component can be different. In this case, the boundary regions for the luma component and the chroma component can also be different. The above CU or the left CU may correspond to a smallest CU (SCU).

DETAILED DESCRIPTION

Figure 1A:
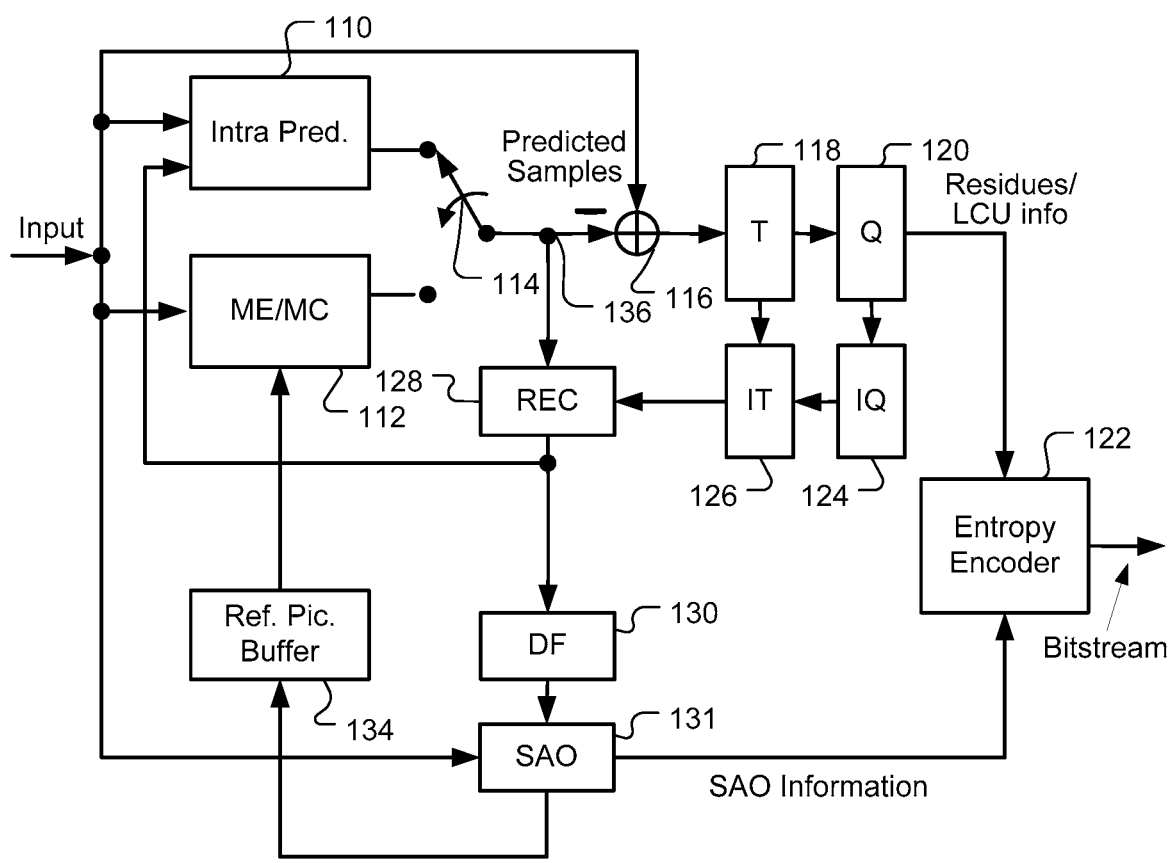
FIG. 1A illustrates an exemplary adaptive inter/intra video encoder associated with an HEVC coding system.
Figure 1B:
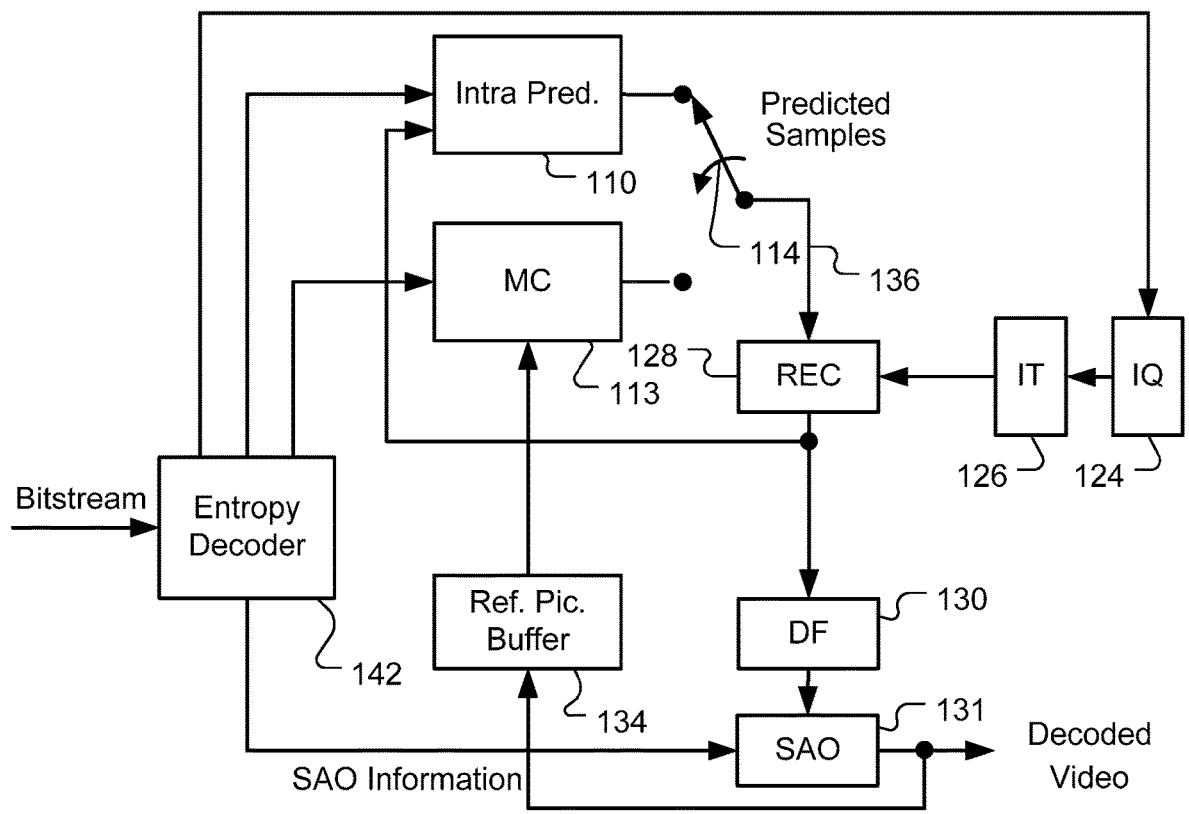
FIG. 1B illustrates an exemplary adaptive inter/intra video decoder associated with an HEVC coding system.
Figures 2, 3A, 3B:
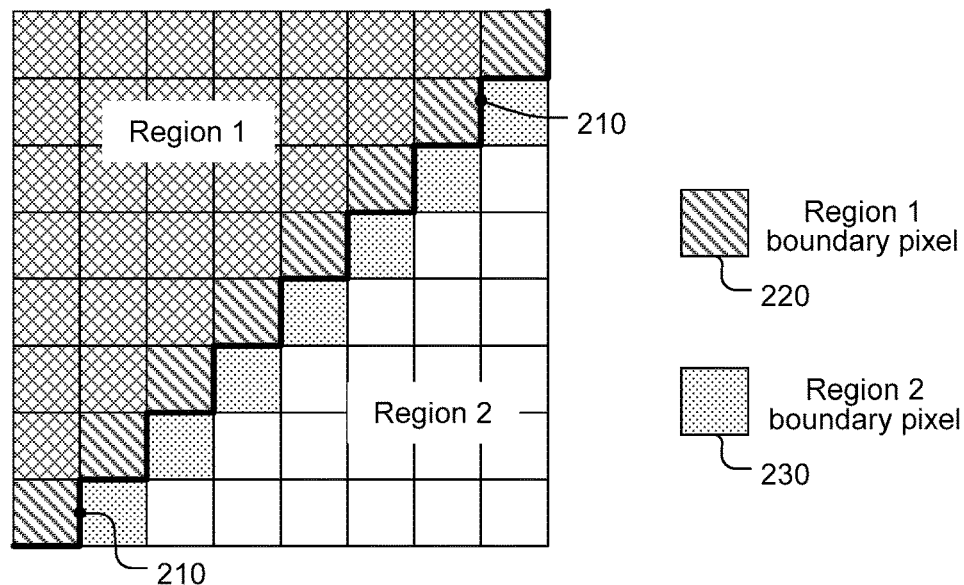
FIG. 2 illustrates an example of Overlapped Block Motion Compensation (OBMC) for geometry partitions.
FIG. 3A illustrates exemplary Overlapped Block Motion Compensation (OBMC) for 2N×N prediction units (PUs).
FIG. 3B illustrates exemplary Overlapped Block Motion Compensation (OBMC) for N×2N prediction units (PUs).
Figures 4A, 4B:
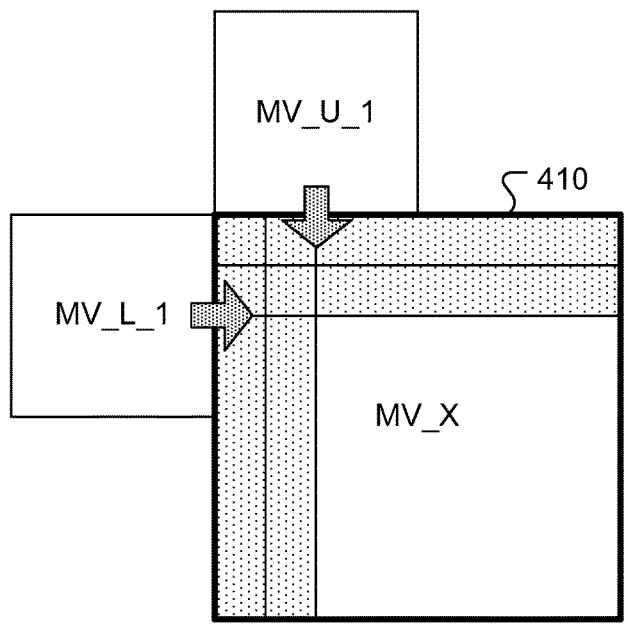
FIG. 4A illustrates an example of Motion Boundary Enhancement (MBE) according to an embodiment of the present invention, where an above motion vector and a left motion vector are used with the current motion vector to form weighted prediction for boundary pixels.
FIG. 4B illustrates an example of weighting factors for Motion Boundary Enhancement (MBE) according to an embodiment of the present invention.

In HEVC, each coding unit (CU) may be partitioned into one or more prediction units. The OBMC is only applied to PU boundaries as described in the previous section. However, motion discontinuity may also exist at the CU boundaries as well. Accordingly, the present invention discloses a boundary pixel processing technique named motion boundary enhancement (MBE) to improve the motion compensated prediction at the CU boundaries. FIG. 4 illustrates an example according to an embodiment of the present invention. In FIG. 4A, the current CU boundaries are indicated by thicklines (410). The pixels at the CU boundaries will use the motion vector(s) from the upper side (MV_U_1), the left side (MV_L_1) or both the upper side and the left side in addition to its own motion vector (MV_X) to form a weighted sum of motion prediction when performing motion compensation. Note that MV_U_1 is the first available motion vector derived from the upper CUs and MV_L_1 is the first available motion vector derived from the left CUs. It is well known in HEVC that a CU may be partitioned into multiple PUs and each PU may have its own motion vector. Therefore, the motion vector (i.e., MV_X) for a pixel in the CU boundary depends on which PU that the pixel is located.

FIG. 4B illustrates an example of MBE in details according to an embodiment of the present invention. Pixels A through D in FIG. 4B correspond to the overlapped vertical and horizontal boundaries. Both motion vectors MV_U_1 and MV_L_1 will be used for these pixels in addition to MV_X. The weighting factors are (2/8, 2/8, 4/8) for MV_U_1, MV_L_1 and MV_X, respectively for pixel A. In other words, pixel A according to MBE is calculated as a weighted sum of three predictors associated with three motion vectors (i.e., MV_U_1, MV_L_1 and MV_X). Each predictor is derived using motion compensation based on the respective motion vector. After the three predictors are derived, pixel A is generated based on the three predictors using the weighting factor (2/8, 2/8, 4/8). For pixel B, the corresponding weighting factors are (2/8, 1/8, 5/8). For pixel C, the corresponding weighting factors are (1/8, 2/8, 5/8). For pixel D, the corresponding weighting factors are (1/8, 1/8, 6/8). For pixels labeled as E and F, only MV_U_1 will be used with MV_X. The weighting factors are (2/8, 6/8) for MV_U_1 and MV_X for pixel E. For pixel F, the weighting factors are (1/8, 7/8). For pixels labeled as G and H, only MV_L_1 will be used with MV_X. The weighting factors are (2/8, 6/8) for MV_L_1 and MV_X for pixel G. For pixel H, the weighting factors are (1/8, 7/8).

The weighting factors disclosed above are intended to illustrate examples of MBE. These exemplary weighting factors shall not be construed as limitations to the present invention. A person skilled in the art may use other weighting factors to practice the present invention. The weighting factors can be pre-defined or adaptively determined based on a distance between the current boundary pixel and a left or above CU boundary. For example, a larger weighting factor may be used for a boundary pixel at a shorter distance from the CU boundary. While the example in FIG. 4B includes two pixel lines and two pixel columns in the boundary region, different number of pixel lines/columns may also be used to practice the present invention. The size of the boundary region can be pre-defined or adaptively determined based on CU size or PU size. For example, more pixel lines or columns may be used for larger CU or PU sizes.

The MBE processing can be always enabled and applied for video data being coded. However, the MBE process may also be turned On/Off explicitly. For example, a flag may be used to indicate whether MBE process is On or Off for the underlying video data. The underlying data may correspond to a CU, a CTU (coding tree unit), a CTB (coding tree block), a slice, a picture or a sequence. The MBE may also be applied to difference color components of the video data. Different MBE process may be applied to different color components. For example, the MBE process may be applied to the luma component, but not the chroma component. Alternatively, MBE process may be applied to both luma and chroma component. However, the weighting factors are different for different color components. Furthermore, different boundary regions may be selected for different color components. For example, less pixel lines/columns can be used for the chroma components.

MBE can be applied independently from OBMC. It may also be applied before or after the OBMC process so that not only PU boundaries but also CU boundaries can be improved with multiple motion vectors. Furthermore, it may also be applied jointly with the OBMC process to share data accessed during processing. Therefore, the joint processing may reduce memory access bandwidth or reduce buffer requirement.

Figure 5:
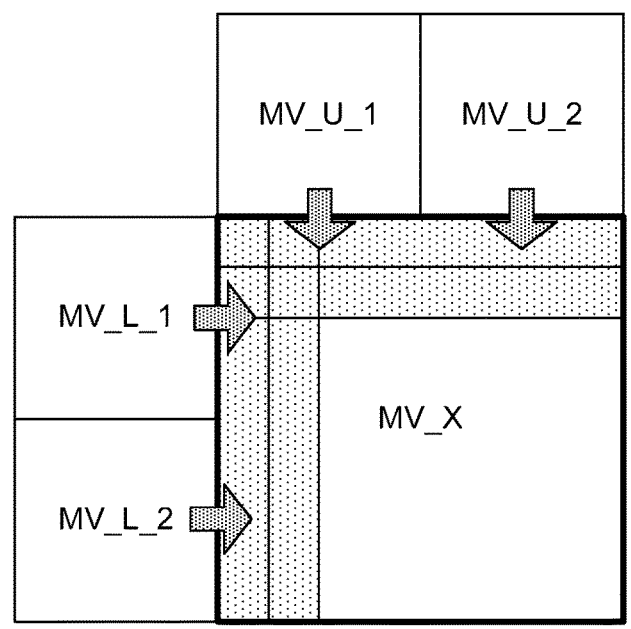
FIG. 5 illustrates an example of fine-grained Motion Boundary Enhancement (fg-MBE) according to an embodiment of the present invention, where the above motion vector and the left motion vector are determined based on smallest coding unit (SCU).

To further improve the coding performance, fine-grained MBE (fg-MBE) can be used. FIG. 5 illustrates an example of fine-grained MBE. In FIG. 5, for the current CU with size 8×8, the neighboring motion vectors from the left side and the upper side are derived based on 4×4 smallest coding unit (SCU). As is known in HEVC, a CU may be partitioned into smaller CUs using quadtree. The partition process may stop when the CU reaches the smallest size, i.e., smallest CU (SCU). The SCU according to HEVC can be 4×4. While the current CU size of 8×8 is illustrated in the example of FIG. 5, the current CU may correspond to other sizes (e.g., 16×16 or 32×32). Since the motion vectors for each SCU may belong to different PUs or even different CUs, the motion vectors may be different from each other. For example, MV_L_1 and MV_L_2 in FIG. 5 may be different. Also, MV_U_1 and MV_U_2 may be different. The motion information derived accordingly will be more accurate to generate more accurate motion compensated predictors. In some cases, the motion vector may not be available for an SCU. For example, the SCU is Intra coded or the SCU is a boundary block with a valid MV. In this case, a motion compensated predictor can be generated by data padding or using weighted sum from the existing predictors.

Figure 6:
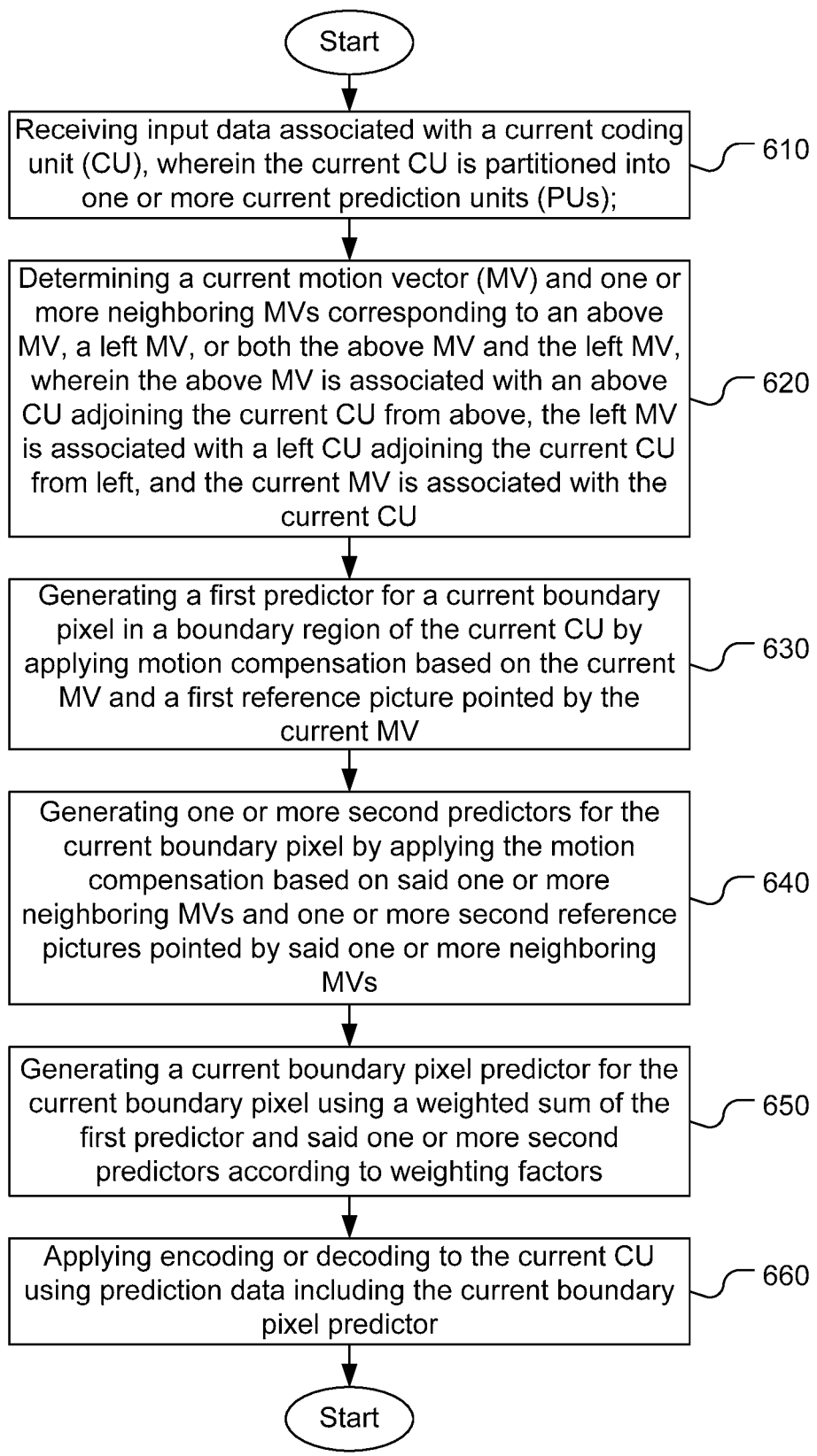
FIG. 6 illustrates an exemplary flow chart for a video coding system incorporating Motion Boundary Enhancement according to an embodiment of the present invention.

FIG. 6 illustrates an exemplary flowchart for a video coding system incorporating Motion Boundary Enhancement according to an embodiment of the present invention. The input data associated with a current coding unit (CU), wherein the current CU is partitioned into one or more current prediction units (PUs) as shown in step 610. The input data associated with the current coding unit may be accessed from a media such as a RAM or DRAM in a system. Also the input data associated with the current coding unit may be received directly from a processor (such as a central processing unit, a controller or a digital signal processor). At an encoder side, the input data corresponds to the pixel data to be processed according to motion compensation. At the decoder side, the input data corresponds to motion compensated residue and the decoding process will reconstruct the current CU using motion compensated prediction and motion compensated residue. A current motion vector (MV) and one or more neighboring MVs corresponding to an above MV, a left MV, or both the above MV and the left MV are determined in step 620. The above MV is associated with an above CU adjoining the current CU from above, the left MV is associated with a left CU adjoining the current CU from left, and the current MV is associated with the current CU. A first predictor for a current boundary pixel in a boundary region of the current CU is generated by applying motion compensation based on the current MV and a first reference picture pointed by the current MV in step 630. One or more second predictors for the current boundary pixel are generated by applying the motion compensation based on said one or more neighboring MVs and one or more second reference pictures pointed by said one or more neighboring MVs in step 640. A current boundary pixel predictor for the current boundary pixel is generated using a weighted sum of the first predictor and said one or more second predictors according to weighting factors in step 650. Encoding process (for an encoder) or decoding process (for a decoder) is then applied to the current CU using prediction data including the current boundary pixel predictor as shown in step 660.

The exemplary flowchart shown in FIG. 6 is for illustration purpose. A skilled person in the art may re-arrange, combine steps or split a step to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of motion compensated prediction for boundary pixels in a video coding system, the method comprising:
   receiving input data associated with a current prediction unit (PU) within a current coding unit (CU), wherein:
      the current CU is partitioned into a plurality of PUs and the current PU is one of the plurality of PUs;
      each of the plurality of PUs is associated with a corresponding prediction type; and
      the current PU is associated with a current motion vector (MV);
   generating Motion Boundary Enhancement (MBE) prediction for the current PU, the current PU having a plurality of neighboring PUs that comprise:
      (a) a first neighboring PU of the plurality of neighboring PUs on a first side of the current PU, the first neighboring PU having a first neighboring MV; and
      (b) a second neighboring PU and a third neighboring PU of the plurality of neighboring PUs that are both on a second side of the current PU, the second neighboring PU having a second neighboring MV and the third neighboring PU having a third neighboring MV, wherein the second side is different than the first side, and
   wherein said generating MBE prediction comprises:
      generating a first predictor for the current PU by applying motion compensation based on the current MV associated with the current PU;
      determining a plurality of pixels of the current PU are in an overlapped boundary region of (a) the first side and the second side of the current PU included in first CU boundaries of the current CU with (b) associated PU boundaries of the plurality of neighboring PUs that are included in one or more second CU boundaries, wherein each of the plurality of pixels in the overlapped boundary region comprises an associated predetermined distance inward from at least one of the plurality of the neighboring PUs;
      for a first pixel of the plurality of pixels of the current PU:
         generating a first secondary predictor for the pixel by applying the motion compensation based on the first neighboring MV; and
         generating a first current boundary pixel predictor for the first pixel using a first weighted sum of the first predictor and said first secondary predictor according to weighting factors;
      for a second pixel of the plurality of pixels:
         generating a second secondary predictor for the second pixel by applying the motion compensation based on the second neighboring MV; and
         generating a second current boundary pixel predictor for the second pixel using a second weighted sum of the first predictor and said second secondary predictor according to the weighting factors;

for a third pixel of the plurality of pixels:
  generating a third secondary predictor for the third pixel by applying the motion compensation based on the third neighboring MV; and
  generating a third current boundary pixel predictor for the third pixel using a third weighted sum of the first predictor and said third secondary predictor according to the weighting factors; and
applying encoding or decoding to the current PU using prediction data including the first predictor and the first, second and third current boundary pixel predictors.

2. The method of claim 1, wherein the overlapped boundary region of the current CU corresponds to a number of pixel lines, pixel columns, or both at the first CU boundaries of the current CU.

3. The method of claim 2, wherein the number of pixel lines, pixel columns, or both at the first CU boundaries of the current CU is pre-defined or adaptively determined based on CU size or PU size.

4. The method of claim 1, wherein the weighting factors are pre-defined or adaptively determined based on a location of the pixel in the overlapped boundary region.

5. The method of claim 1, further comprising for the first pixel,
  generating a fourth secondary predictor for the first pixel by applying the motion compensation based on a fourth neighboring MV;
  wherein the first neighboring MV is an above MV and the fourth neighboring MV is a left MV, such that two secondary predictors are generated for the first pixel based on the above MV and the left MV respectively.

6. The method of claim 5, wherein generating MBE prediction is performed twice;
  said generating the first secondary predictor occurs during first said generating MBE prediction; and
  said generating the fourth secondary predictor occurs during second said generating MBE prediction.

7. The method of claim 1, wherein said generating MBE prediction is always performed for the current CU, or is turned On/Off explicitly.

8. The method of claim 1, further comprising applying overlapped boundary motion compensation (OBMC) to the plurality of pixels in the current CU.

9. The method of claim 1, wherein the current CU comprises a luma component and at least one chroma component, and the weighting factors for the luma component and the at least one chroma component are different.

10. The method of claim 1, wherein the current CU comprises a luma component and a chroma component, and the overlapped boundary regions for the luma component and the chroma component are different.

11. The method of claim 1, wherein the first neighboring PU is an above PU and the above PU corresponds to a smallest CU (SCU).

12. The method of claim 1, wherein the first neighboring PU is a left PU and the left PU corresponds to a smallest CU (SCU).

13. An apparatus for deriving motion compensated prediction for boundary pixels in a video coding system, the apparatus comprising one or more electronic circuits configured to:
  receive input data associated with a current prediction unit (PU) within a current coding unit (CU), wherein:
    the current CU is partitioned into a plurality of PUs and the current PU is one of the plurality of PUs;
    each of the plurality of PUs is associated with a corresponding prediction type; and
    the current PU is associated with a current motion vector (MV);
  generate a first predictor for the current PU by applying motion compensation based on the current MV associated with the current PU;
  determine a plurality of pixels of the current PU are in an overlapped boundary region of (a) a first side and a second side of the current PU included in first CU boundaries of the current CU with (b) associated PU boundaries of a plurality of neighboring PUs that are included one or more second CU boundaries, wherein:
    (a) a first neighboring PU of the plurality of neighboring PUs is on a first side of the current PU, the first neighboring PU having a first neighboring MV; and
    (b) a second neighboring PU and a third neighboring PU of the plurality of neighboring PUs are both on a second side of the current PU, the second neighboring PU having a second neighboring MV and the third neighboring PU having a third neighboring MV, wherein the second side is different than the first side; and
    each of the plurality of pixels in the overlapped boundary region comprises an associated predetermined distance inward from at least one of the plurality of the neighboring PUs;
  for a first pixel of the plurality of pixels of the current PU:
    generate a first secondary predictor for the pixel by applying the motion compensation based on the first neighboring MV; and
    generate a first current boundary pixel predictor for the first pixel using a first weighted sum of the first predictor and said first secondary predictor according to weighting factors;
  for a second pixel of the plurality of pixels:
    generate a second secondary predictor for the second pixel by applying the motion compensation based on the second neighboring MV; and
    generate a second current boundary pixel predictor for the second pixel using a second weighted sum of the first predictor and said second secondary predictor according to the weighting factors;
  for a third pixel of the plurality of pixels:
    generate a third secondary predictor for the third pixel by applying the motion compensation based on the third neighboring MV; and
    generate a third current boundary pixel predictor for the third pixel using a third weighted sum of the first predictor and said third secondary predictor according to the weighting factors; and
  apply encoding or decoding to the current PU using prediction data including the first predictor and the first, second and third current boundary pixel predictors.

14. The apparatus of claim 13, wherein the overlapped boundary region of the current CU corresponds to a number of pixel lines, pixel columns, or both at the first CU boundaries of the current CU.

15. The apparatus of claim 13, wherein the weighting factors are pre-defined or adaptively determined based on a location of the pixel in the overlapped boundary region.

16. The apparatus of claim 13, wherein the current CU comprises a luma component and at least one chroma component and the weighting factors for the luma component and the at least one chroma component are different.

17. The apparatus of claim 13, wherein the current CU comprises a luma component and a chroma component; and numbers of pixel lines or pixel columns corresponding to the boundary pixels at the first CU boundaries of the current CU are different for the luma component and the chroma component.

18. The apparatus of claim 13, wherein the first neighboring PU corresponds to a smallest CU (SCU).

19. A method of motion compensated prediction for boundary pixels in a video coding system, the method comprising:
receiving input data associated with a current prediction unit (PU) within a current coding unit (CU), wherein:
the current CU is partitioned into a plurality of PUs and the current PU is one of the plurality of PUs;
each of the plurality of PUs is associated with a corresponding prediction type; and
the current PU is associated with a current motion vector (MV);
generating Motion Boundary Enhancement (MBE) prediction for the current PU, the current PU having a plurality of neighboring PUs,
wherein said generating MBE prediction comprises:
generating a first predictor for the current PU by applying motion compensation based on the current MV associated with the current PU;
generating a current boundary pixel predictor for each pixel in a set of pixels of the current PU in an overlapped boundary region of (a) a first side and a second side of the current PU included in first CU boundaries of the current CU with (b) associated PU boundaries of the plurality of neighboring PUs that are included in one or more second CU boundaries;
determining a pixel is in the overlapped boundary region of the current PU, wherein the set of pixels of the current PU in the overlapped boundary region comprises a predetermined distance from one of the neighboring PUs inward the current PU;
generating a secondary predictor for the pixel by applying the motion compensation based on a neighboring MV of the one of the neighboring PUs;
generating the current boundary pixel predictor for the pixel using a weighted sum of the first predictor and said secondary predictor according to weighting factors;
generating a plurality of current boundary pixel predictors for the set of pixels in the overlapped boundary region by repeating the step of generating the current boundary pixel predictor more than two times based on at least two other neighboring PUs that are each on a third side from the PU that is different from a fourth side of the current PU neighboring the one of the neighboring PUs, and wherein motion vectors of the at least two other neighboring PUs are different from each other; and
applying encoding or decoding to the current PU using prediction data including the first predictor and the current boundary pixel predictors.

* * * * *